United States Patent
Han et al.

(10) Patent No.: US 8,643,632 B2
(45) Date of Patent: Feb. 4, 2014

(54) DISPLAY DEVICE

(75) Inventors: Ho-Seok Han, Yongin (KR); Ji-Seob Kim, Yongin (KR); Jung-Yun Kim, Yongin (KR); Chul-Ho Kim, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 431 days.

(21) Appl. No.: 13/028,156

(22) Filed: Feb. 15, 2011

(65) Prior Publication Data

US 2011/0279418 A1    Nov. 17, 2011

(30) Foreign Application Priority Data

May 12, 2010    (KR) .......................... 10-2010-0044372

(51) Int. Cl.
*G06F 3/038*    (2013.01)
(52) U.S. Cl.
USPC ........................................... 345/204; 345/98
(58) Field of Classification Search
USPC ................... 345/204, 143, 98, 54, 37
See application file for complete search history.

(56) References Cited

U.S. PATENT DOCUMENTS

| | | | |
|---|---|---|---|
| 8,284,340 B2 * | 10/2012 | Park et al. ........................ | 349/54 |
| 2010/0002180 A1 * | 1/2010 | Kim et al. ........................ | 349/143 |
| 2010/0007809 A1 * | 1/2010 | You et al. ........................ | 349/37 |
| 2010/0045586 A1 * | 2/2010 | Kim ................................ | 345/98 |

FOREIGN PATENT DOCUMENTS

KR    10-0318004 B1    12/2001
KR    10-2006-0029369 A    4/2006

* cited by examiner

*Primary Examiner* — Amare Mengistu
*Assistant Examiner* — Joseph G Rodriguez
(74) *Attorney, Agent, or Firm* — Christie, Parker & Hale, LLP

(57) ABSTRACT

A display device includes a display panel having an active area in which sub-pixels formed at crossing regions of data lines extending in a first direction and gate lines extending in a second direction crossing the first direction are arranged, and a non-active area outside of the active area. A driver supplies a drive signal to the gate and data lines in the display panel. Data links are extended in the first direction from the driver to supply a data signal to the data lines. Gate links are extended out from the driver and extended up to the active area in the first direction from the non-active area between the driver and the active area so as to supply a gate signal to the gate lines extending in the second direction. Accordingly, it is possible to reduce or minimize the area of the non-active area and/or to improve an aperture ratio.

19 Claims, 9 Drawing Sheets

DISPLAY DEVICE

CROSS-REFERENCE TO RELATED APPLICATION

This application claims priority to and the benefit of Korean Patent Application No. 10-2010-0044372, filed on May 12, 2010, in the Korean Intellectual Property Office, the entire content of which is incorporated herein by reference.

BACKGROUND

1. Field

The following description relates to a display device, and more particularly, to a display device capable of reducing or minimizing the area of a non-active area and improving an aperture ratio.

2. Description of the Related Art

As demands on various types of display devices have recently been increased with the development of the information society, studies on display devices such as a liquid crystal display device (LCD), a plasma display panel (PDP), a field emission display device (FED), an electrophoretic display device (EPD) and an organic light emitting display device (OLED) have been actively conducted.

The display devices can be classified into a passive matrix type or an active matrix type. In active matrix type display devices, sub-pixels are arranged in a matrix form. The active matrix type display devices are more in demand because they have superior resolution and moving-picture realizing ability as compared to passive matrix type display devices.

SUMMARY

An aspect of an embodiment of the present invention is directed toward a display device capable of reducing or minimizing the area of a non-active area and improving an aperture ratio.

According to an embodiment of the present invention, there is provided a display device including a display panel having an active area in which sub-pixels formed at crossing regions of data lines extending in a first direction and gate lines extending in a second direction crossing the first direction are arranged, and a non-active area outside of the active area; a driver for supplying a drive signal to the gate and data lines in the display panel; data links extending in the first direction from the driver to supply a data signal to the data lines; and gate links extending out from the driver and extended up to the active area in the first direction from the non-active area between the driver and the active area so as to supply a gate signal to the gate lines extending in the second direction.

In one embodiment, the gate links formed in the non-active area are formed only in the non-active area between the driver and the active area, and the gate links are formed on a same line with the data lines in the active area. In one embodiment, a gate link of the gate links and a corresponding data line of the data lines are formed to overlap with each other with an insulating layer interposed therebetween. In one embodiment, a gate link of the gate links is extended up to a corresponding gate line of the gate lines to be electrically connected thereto.

In one embodiment, the gate links form pairs of gate links, and each of the pairs of gate links are formed on a same line in the active area. In one embodiment, paired gate links in each of the pairs of gate links are formed to overlap with each other with an insulating layer interposed therebetween. In one embodiment, a gate link of the gate links is extended up to a corresponding gate line of the gate lines to be electrically connected thereto. In one embodiment, two pairs of the pairs of gate links are formed with two sub-pixels of the sub-pixels extending in the second direction interposed therebetween, except at first side sub-pixels of the sub-pixels positioned at a first outermost side of the active area, and only one gate link of the gate links is formed at a side portion of second side sub-pixels of the sub-pixels positioned at a second outermost side of the active area. In one embodiment, the data lines form pairs of data lines, and each of the pairs of data lines are formed on a same line in the active area. In one embodiment, paired data lines in each of the pairs of data lines are formed to overlap with each other with an insulating layer interposed therebetween. In one embodiment, one data line of the data lines is formed at a side portion of the sub-pixels positioned at an outermost side of the active area, and two pairs of the pairs of data lines are formed with two sub-pixels of the sub-pixels extending in the second direction interposed therebetween, except at side sub-pixels of the sub-pixels positioned at an outermost side of the active area.

According to an embodiment of the present invention, there is provided a display device including a display panel having an active area in which sub-pixels formed at crossing regions of data lines extending in a first direction and gate lines extending in a second direction crossing the first direction are arranged, and a non-active area outside of the active area; a driver for supplying a drive signal to the gate and data lines in the display panel; and gate links extending out from the driver and extended up to the active area from the non-active area between the driver and the active area so as to supply a gate signal to the gate lines, wherein the gate links formed in the non-active area are formed only in the non-active area between the driver and the active area.

In one embodiment, the gate links are extended in the first direction of the data lines in the active area.

In one embodiment, a gate link of the gate links and a corresponding data line of the data lines are formed to overlap with each other on the same line with an insulating layer interposed therebetween.

In one embodiment, a gate link of the gate links is extended up to a corresponding gate line of the gate lines to be electrically connected thereto.

According to an embodiment of the present invention, there is provided a display device including a display panel having an active area in which sub-pixels formed at crossing regions of data lines extending in a first direction and gate lines extending in a second direction crossing the first direction are arranged, and a non-active area outside of the active area; a driver for supplying a drive signal to the gate and data lines in the display panel; data links extending in the first direction from the driver to supply a data signal to the data lines; and gate links extending out from the driver and extended up to the active area from the non-active area between the driver and the active area so as to supply a gate signal to the gate lines, wherein: the gate links formed in the non-active area are formed only in the non-active area between the driver and the active area; the gate links form pairs of gate links, and each of the pairs of gate links are formed on a same line, except at first side sub-pixels of the sub-pixels positioned at another side of an outermost side of the active area; and the data lines form pairs of data lines, and each of the pairs of data lines are formed on a same line, except at second side sub-pixels of the sub-pixels positioned at the outermost side of the active area.

In one embodiment, paired gate links in each of the pairs of gate links are formed to overlap with each other with a first insulating layer interposed therebetween, and data lines in each of the pairs of data lines are formed to overlap with each other with a second insulating layer interposed therebetween.

In one embodiment, only one data line of the data lines is formed at a side portion of the sub-pixels positioned at the outermost side of the active area, and only one gate line of the gate lines is formed at a side portion of the sub-pixels positioned at the other side of the outermost side of the active area.

In one embodiment, two pairs of the pairs of gate links are formed with two sub-pixels of the sub-pixels extending in the second direction interposed therebetween, except at the first side sub-pixels of the sub-pixels positioned at the other side of the outermost side of the active area.

In one embodiment, two pairs of the pairs of data lines are formed with two sub-pixels of the sub-pixels extending in the second direction interposed therebetween, except at the second side sub-pixels of the sub-pixels positioned at the outermost side of the active area.

According to embodiments of the present invention, gate links arranged in a non-active area are extended in the same direction as data links, and are formed in an active area to overlap with the data links and data lines with an insulating layer interposed therebetween, so that the non-active area positioned at both sides of the active area can be removed, or the area of the non-active area can be reduced or minimized.

Also, the gate links are extended in the same direction as the data links, and are formed in the active area to overlap with each other with the insulating layer interposed therebetween. The data lines are formed to overlap with each other with the insulating layer interposed therebetween, so that the non-active area positioned at both sides of the active area can be removed, or the area of the non-active area can be reduced or minimized.

Also, the area of a black matrix formed in conjunction with the width or area of a non-display area in the active and non-active areas can be reduced or minimized, thereby improving an aperture ratio.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
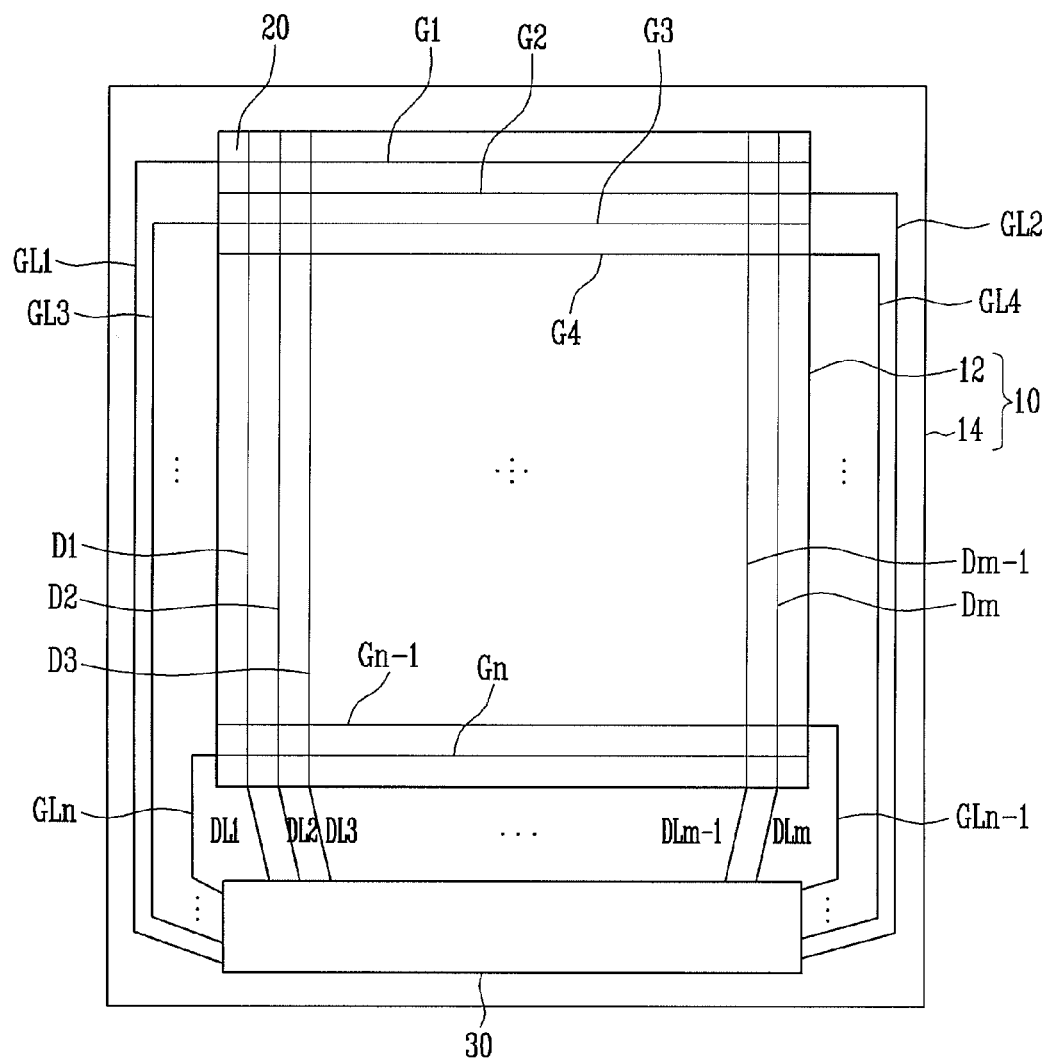
FIG. 1 is a view showing the configuration of a related art display device.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Hereinafter, display devices according to embodiments of the present invention will be described in more detail with respect to the accompanying drawings.

i) Shapes, sizes, rates, angles, numbers and the like, shown in the accompanying drawings, are provided only for illustrative purposes, and may be modified to some extent. ii) Since the drawings are viewed with observer's eyes, directions or positions described in the drawings may be variously modified depending on observer's positions. iii) Like reference numerals may be used to indicate like parts throughout the drawings.

iv) When the terms 'comprise', 'have', 'include' and the like are used, other parts may be added as long as the term, such as 'only', is not used. v) The singular forms may be interpreted as the plural forms. vi) Although the terms 'about', 'substantially' and the like are not used, shapes, comparisons between sizes, relations between positions, and the like are interpreted to include an ordinary error range. vii) Although the terms 'after', 'before', 'subsequently', 'also', 'here', 'at this time' and the like are used, they are not used to limit temporal positions.

viii) The terms 'first', 'second', 'third' and the like are selectively, mutually or repeatedly used for distinguishing between similar elements and not used as confined meanings. ix) When the position relation between two parts is described using the terms 'on', 'above', 'below', 'next' and the like, one or more parts may be positioned between the two parts as long as the term, such as 'immediately' or 'directly', is not used. x) When parts are linked by the term 'or', they are interpreted individually or in combination, but when they are linked by the term, such as 'or one of', they are only interpreted individually.

Referring to FIG. 1, an active matrix type display device includes a display panel 10 in which sub-pixels 20 are arranged in a matrix form, and a driver 30 for driving the display panel 10. In this case, each of the sub-pixels 20 is a minimum unit in which an image is realized.

The display panel 10 is divided into an active area 12 and a non-active area 14. In the active area 12, the sub-pixels 20 partitioned by gate lines G1 to Gn and data lines D1 to Dm are arranged. In the non-active area 14, gate links GL1 to GLn and data links DL1 to DLm are positioned (at the outside of the active area 12) are connected to the gate lines G1 to Gn and the data lines D1 to Dm, respectively. The driver 30 for supplying a drive signal to the gate links GL1 to GLn and the data links DL1 to DLm is mounted in the non-active area 14.

In this case, the driver 30 may be divided into a gate driver and a data driver. However, in the case of a small-sized display device, the driver 30 is integrally provided as a single driver in which a gate driver for outputting a scan signal and a data driver for outputting an image signal are incorporated into a single chip as shown in FIG. 1.

The gate links GL1 to GLn and the data links DL1 to DLm are extended out from the driver 30 to the non-active area 14, and are respectively connected to the gate lines G1 to Gn and the data lines D1 to Dm, which are arranged to extend in the active area 12. In this case, the gate links GL1 to GLn extend in a first direction that is the vertical direction at both left and right sides of the active area 12, and are respectively connected to the gate lines G1 to Gn arranged in a second direction that is the horizontal direction. To this end, the width of the non-active area 14 positioned at both left and right sides of the active area 12 is a necessity.

However, if the width of the non-active area 14 is increased, the area of the active area 12 is relatively decreased. As the area of a black matrix is increased in conjunction with the width of the non-active area 14, an aperture ratio of the display panel 10 is decreased. That is, according to the structure of the related art display device, it is difficult to increase or maximize the active area.

Figure 2A:
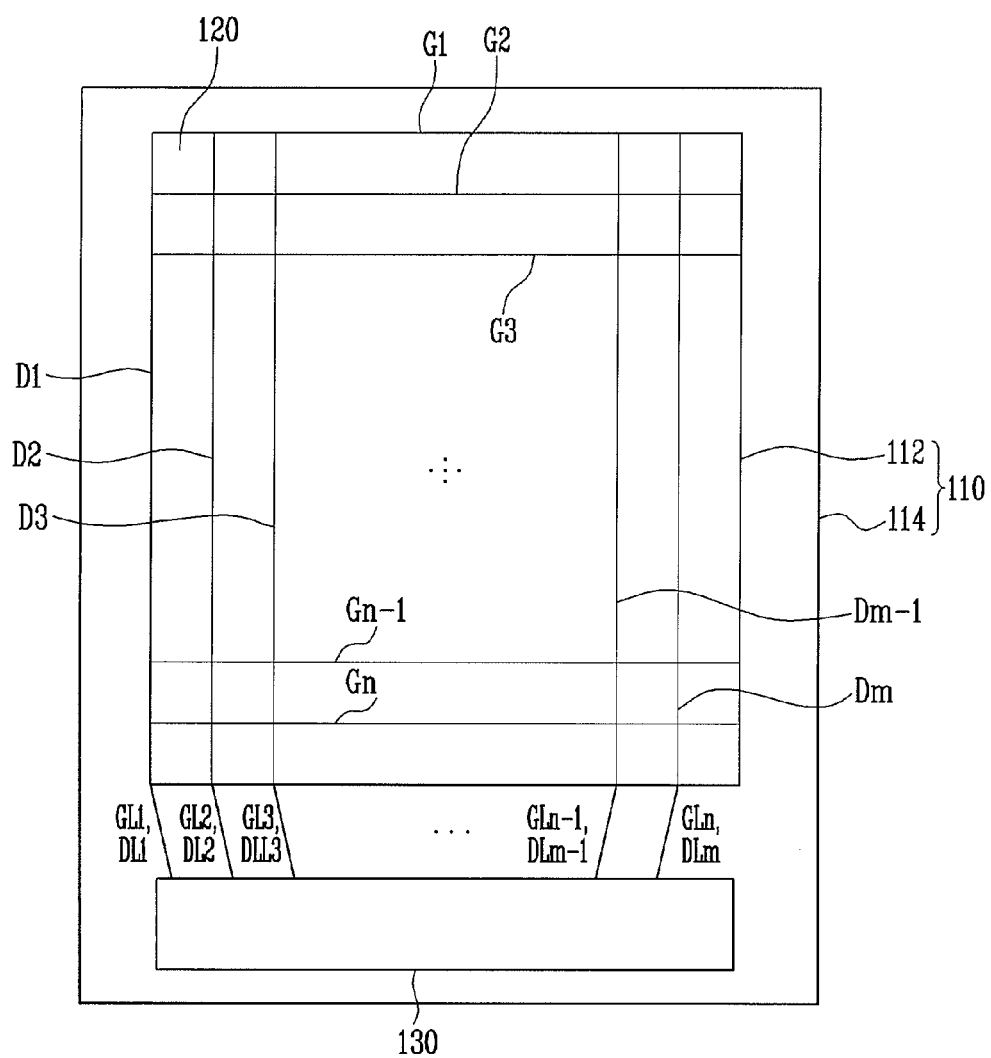
FIG. 2A is a view showing the configuration of a display device according to an embodiment of the present invention.
Figure 2B:
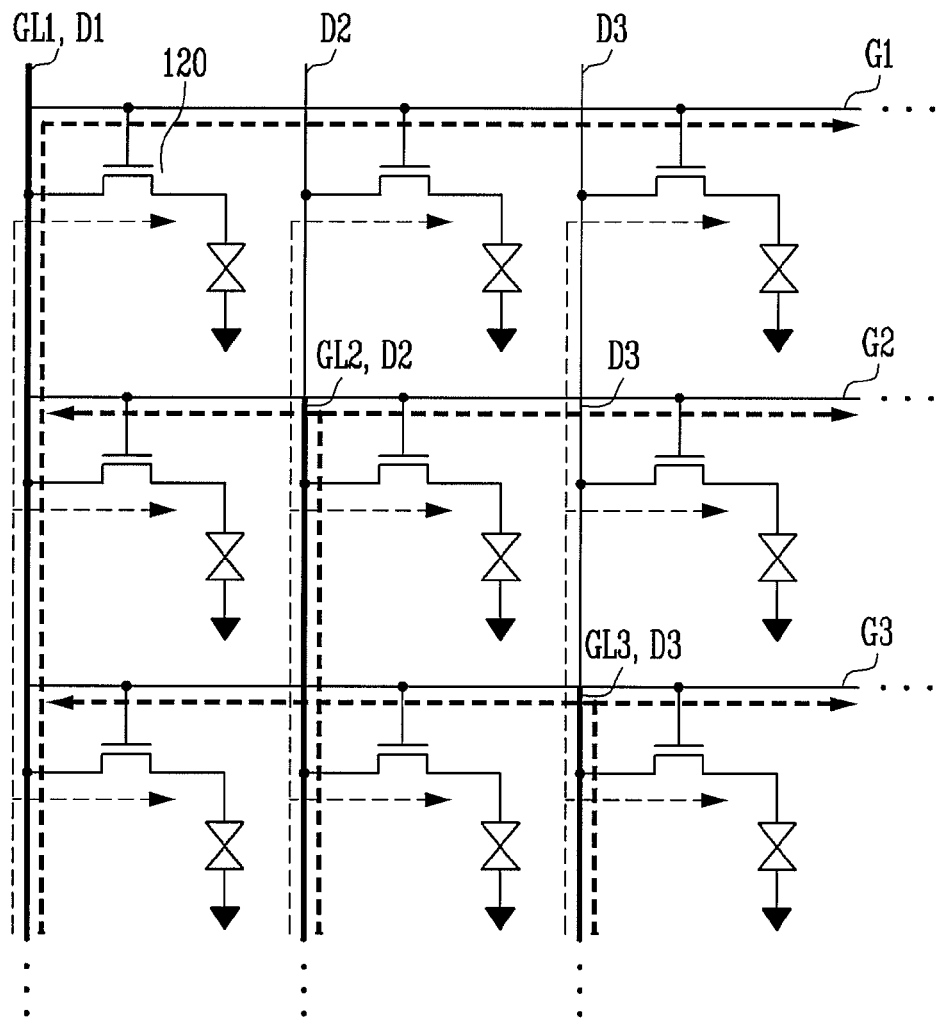
FIG. 2B is an equivalent circuit diagram of the display device shown in FIG. 2A.
Figure 3:
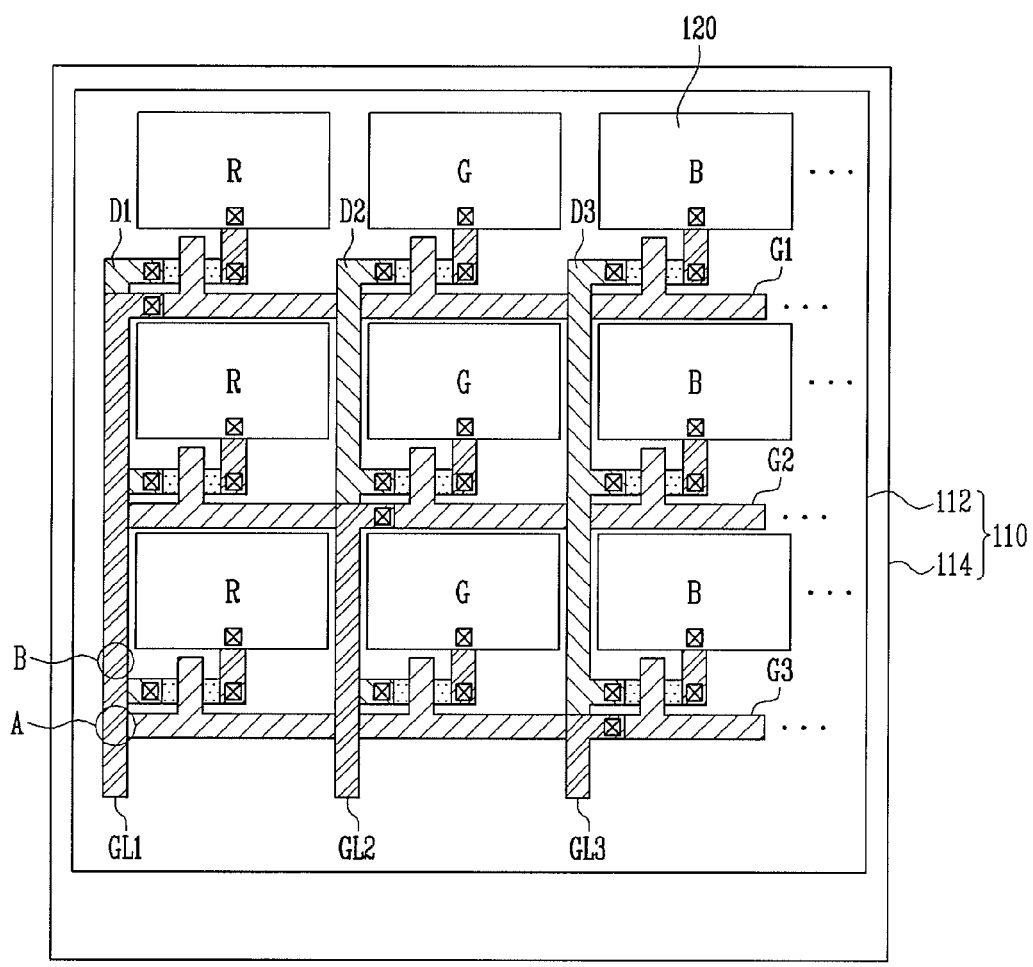
FIG. 3 is a layout of a display panel shown in FIG. 2A.

FIG. 2A is a view showing the configuration of a display device 100 according to an embodiment of the present invention. FIG. 2B is an equivalent circuit diagram of the display device 100 shown in FIG. 2A. FIG. 3 is a layout of a display panel 110 shown in FIG. 2A.

Referring to FIGS. 2A and 2B, the display device 100 according to the embodiment of the present invention includes the display panel 110 and a driver 130 that supplies a drive signal for driving the display panel 110. The drive signal is supplied to gate lines G1 to Gn and data lines D1 to Dm in the display panel 110 through gate links GL1 to GLn and data links DL1 to DLm, extended from the driver 130.

The display panel 110 may be defined by an active area 112 and a non-active area 114. Here, sub-pixels 120, partitioned in a matrix form by intersections (or crossing regions) of the gate lines G1 to Gn and the data lines D1 to Dm, are arranged in the active area 112. The non-active area 114 is positioned at the outside of the active area 112. The non-active area 114 may be defined by four faces positioned at the outside of the active area 112.

The driver 130 for supplying a drive signal to the gate links GL1 to GLn and the data links DL1 to DLm is mounted on one face of the non-active area 114. The data lines D1 to Dm are arranged to extend in a first direction, and the gate lines G1 to Gn are arranged to extend in a second direction perpendicular to (or crossing) the first direction.

The data links DL1 to DLm supply a data signal from the driver 130 to the data lines D1 to Dm. To this end, the data links DL1 to DLm extend in the first direction of the non-active area 114 from the driver 130, and are electrically connected to the data lines D1 to Dm positioned to extend in the first direction of the active area 112, respectively.

The gate links GL1 to GLn supply a gate signal from the driver 130 to the gate lines G1 to Gn. To this end, the gate links GL1 to GLn extend out from the driver 130, and are extended to the active area 112 in the first direction that is the vertical direction in the non-active area 114 between the driver 130 and the active area 112.

Here, the gate links GL1 to GLn formed in the non-active area 114 are positioned only in the non-active area 114 between the driver 130 and the active area 112 of the display panel 110. Since the gate links GL1 to GLn according to the embodiment of the present invention are positioned only in the non-active area 114 between the driver 130 and the active area 112 of the display panel 110, the faces of the non-active area 114, respectively positioned at both sides of the active area 112 can be removed, or the area of the faces can be reduced or minimized.

The gate links GL1 to GLn extended in the first direction that is the vertical direction are electrically connected to the gate lines G1 to Gn arranged to extend in the second direction perpendicular to (or crossing) the first direction in the active area 112, respectively. In this case, the gate links GL1 to GLn are respectively extended up to corresponding gate lines G1 to Gn connected as shown by the bold line of FIG. 2B so as to supply a gate signal to the gate lines G1 to Gn.

That is, as shown in FIG. 3, in the active area 112, a first gate link GL1 extending in the first direction is extended up to a first gate line G1 extending in the second direction, and a second gate link GL2 extending in the first direction is extended up to a second gate line G2 extending in the second direction. In the same manner that a third gate link GL3 extending in the first direction is extended up to a third gate line G3 extending in the second direction, an N-th gate link GLn extending in the first direction is extended up to an N-th gate line Gn extending in the second direction.

In addition, a conductive material used in the gate links GL1 to GLn is electrically connected to a pixel, drain or source electrode of each of the R, G and B sub-pixels 120, so that power can be supplied to the R, G and B sub-pixels 120.

In the embodiment of the present invention, an insulating layer is formed between the gate links GL1 to GLn and the data lines D1 to Dm so as to prevent (or protect from) electrical short circuits between the gate links GL1 to GLn and the data lines D1 to Dm overlapped with the gate links GL1 to GLn in the same first direction in the active area 112.

In this case, since the gate links GL1 to GLn and the data lines D1 to Dm extending in the same first direction are overlapped with each other with the insulating layer interposed therebetween, the interval between the sub-pixels 120 is not changed. That is, a non-display area having signal lines formed therein is not increased in the active area 112.

In the embodiment of the present invention, the gate links GL1 to GLn are formed to overlap with the data lines D1 to Dm, so that the area of a black matrix formed on the non-display area in the active area 112 can be reduced or minimized, thereby improving an aperture ratio.

Figure 4A:
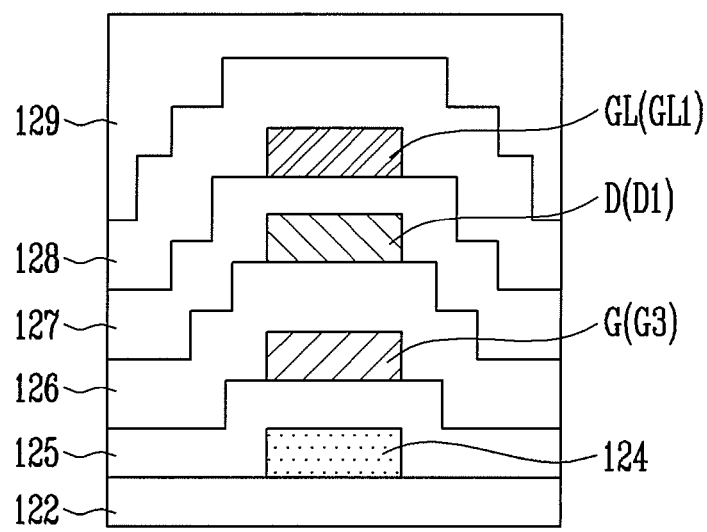
FIG. 4A is a sectional view showing region A of the display panel shown in FIG. 3.

Specifically, in region A in which the first gate link GL1, the first data line D1 and the third gate line G3 are overlapped with one another, a gate line G is positioned on a first insulating layer 125 entirely deposited on a lower substrate 122 as shown in FIG. 4A. A first interlayer insulating layer 126 is positioned on the gate line G, and a data line D is positioned on the first interlayer insulating layer 126. A second interlayer insulating layer 127 is positioned on the data line D, and a gate link GL is positioned on the second interlayer insulating layer 127.

Figure 4B:
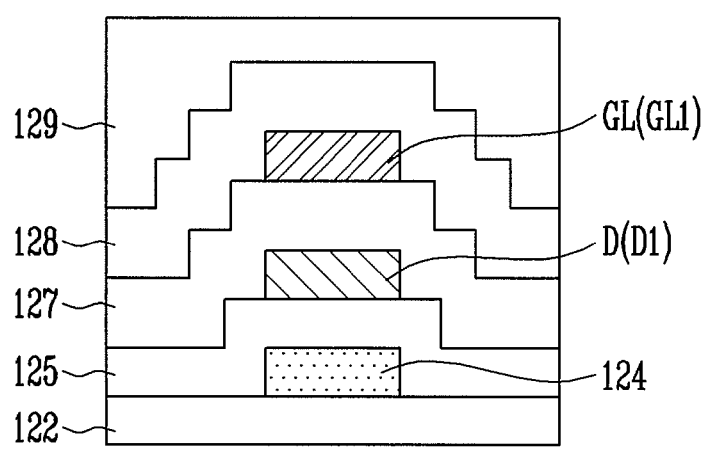
FIGS. 4B and 4C are sectional views showing region B of the display panel shown in FIG. 3.

In the region B in which the first gate link GL1 and the data line D1 are overlapped with each other, the data line D is positioned on the first insulating layer 125 entirely deposited on the lower substrate 122 as shown in FIG. 4B. The second interlayer insulating layer 127 is positioned on the data line D, and the gate link GL is positioned on the second interlayer insulating layer 127.

The gate line G and the data line D are insulated from each other by the first interlayer insulating layer 126, and the data line D and the gate link GL are insulated from each other by the second interlayer insulating layer 127. That is, the gate line G and the data line D are formed to overlap with each other with the first interlayer insulating layer 126 interposed therebetween, and the data line D and the gate link GL are formed to overlap with each other with the second interlayer insulating layer 127 interposed therebetween.

Second and third insulating layers 128 and 129 may be further sequentially stacked on the gate link GL, and a semiconductor layer 124 may be further formed between the lower substrate 122 and the first insulating layer 125.

Figure 4C:
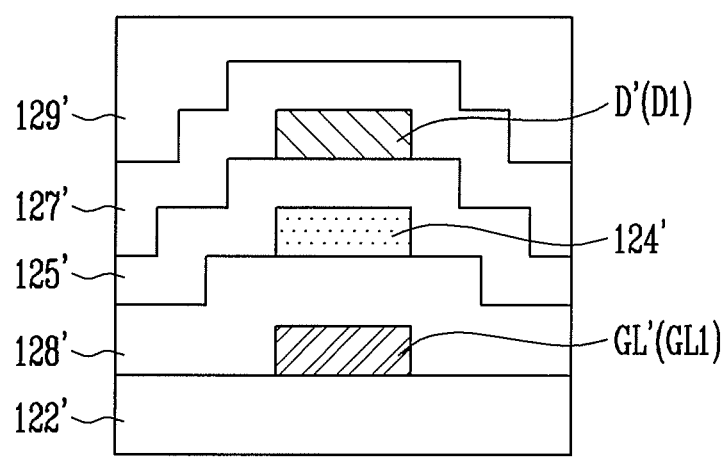

In the region B in which the gate link GL1 and the data line D1 are overlapped with each other, a gate link GL' may be positioned on the lower substrate 122 as shown in FIG. 4C. A second insulating layer 128' and a first insulating layer 125' may be positioned on the gate link GL', and a data line D' may be positioned on the first insulating layer 125'.

The data line D' and the gate link GL' may be insulated from each other by the second insulating layer 128' and the first insulating layer 125'. Second and third insulating layers 127' and 129' may be further sequentially stacked on the data line D', and a semiconductor layer 124' may be further formed between the second insulating layer 128' and the first insulating layer 125'.

Here, the first insulating layer 125 or 125' may be a gate oxide layer or gate insulating layer. The second insulating layer 128 or 128' may be a passivation layer, and the third insulating layer 129 or 129' may be an organic insulating layer.

As described above, according to the embodiment of the present invention, the gate links GL1 to GLn are extended in the same direction as the data links DL1 to DLm, and are overlapped with the data links DL1 to DLm and the data lines D1 to Dm with the insulating layer interposed therebetween. Thus, the gate links GL1 to GLn are not formed on the faces of the non-active area 114, respectively positioned at both sides of the active area 112, but formed in the active area 112. Accordingly, the faces of the non-active area 114, respectively positioned at both sides of the active area 112 having the related art gate links GL1 to GLn formed therein can be removed, or the area of the faces of the non-active area 114 can be reduced or minimized.

In addition, the area of the black matrix formed in conjunction with the width or area of the non-active area 114 can be reduced or minimized, thereby improving the aperture ratio.

Hereinafter, a display device according to another embodiment will be described.

Figure 5A:
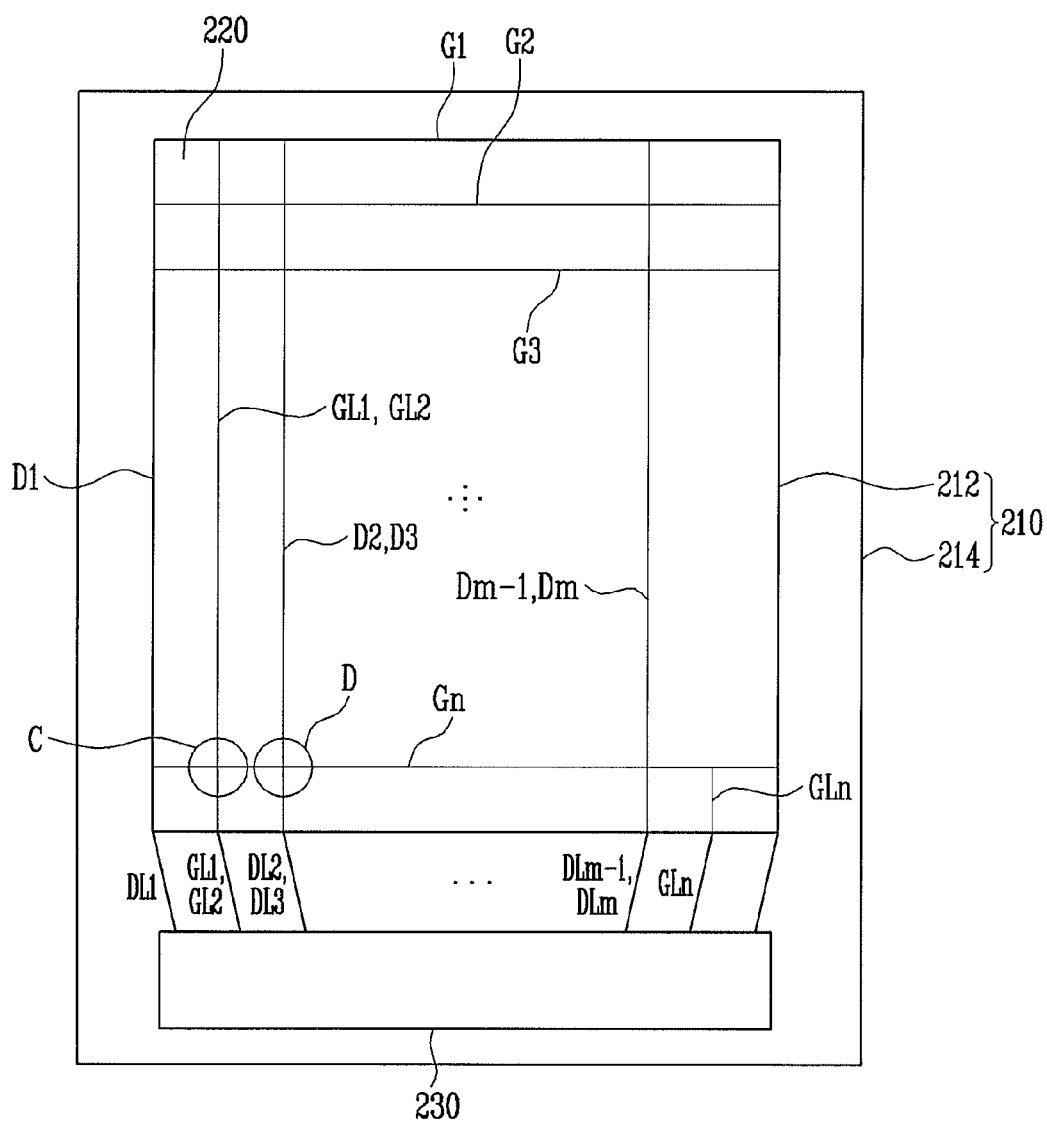
FIG. 5A is a view showing the configuration of a display device according to another embodiment of the present invention.
Figure 5B:
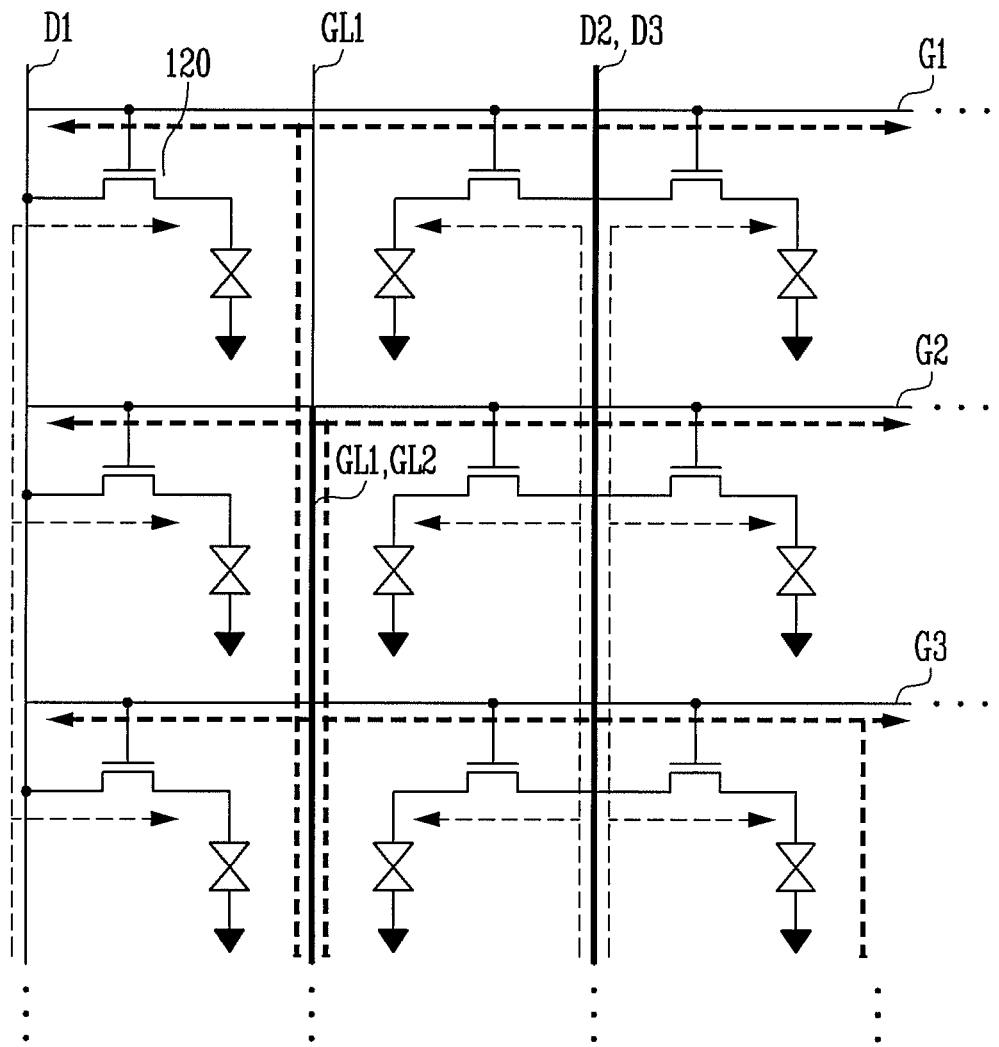
FIG. 5B is an equivalent circuit diagram of the display device shown in FIG. 5A.
Figure 6A:
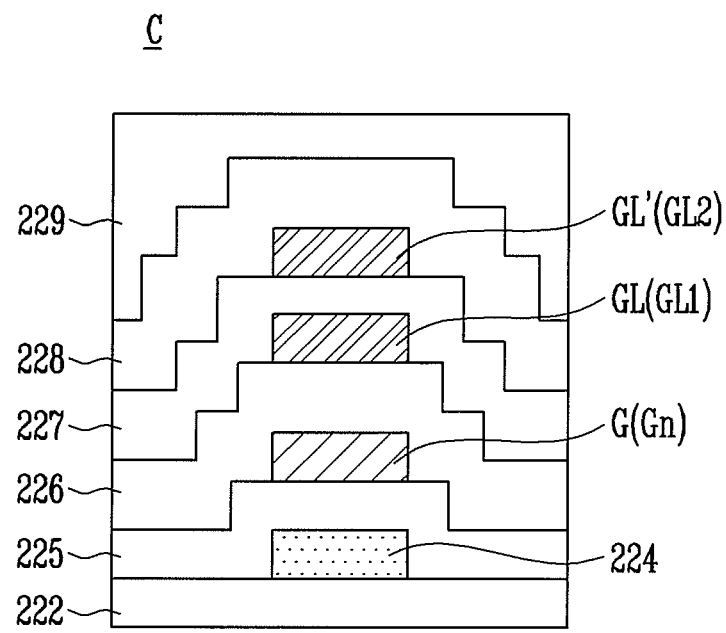
FIG. 6A is a sectional view showing region C of the display panel shown in FIG. 5A.
Figure 6B:
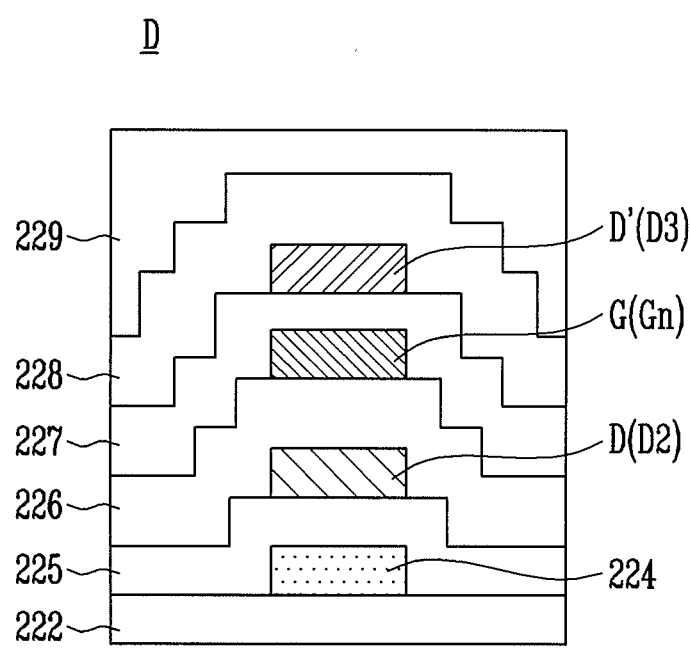
FIG. 6B is a sectional view showing region D of the display panel shown in FIG. 5A.

FIG. 5A is a view showing the configuration of a display device 200 according to another embodiment of the present invention. FIG. 5B is an equivalent circuit diagram of the display device 200 shown in FIG. 5A. FIG. 6A is a sectional view showing region C of a display panel 210 shown in FIG. 5A. FIG. 6B is a sectional view showing region D of the display panel 210 shown in FIG. 5A.

Referring to FIGS. 5A and 5B, the display device 200 according to the embodiment of the present invention includes a display panel 210 and a driver 230 that supplies a drive signal for driving the display panel 210. The drive signal is supplied to gate lines G1 to Gn and data lines D1 to Dm in the display panel 210 through gate links GL1 to GLn and data links DL1 to DLm, extended out from the driver 230.

The display panel 210 may be defined by an active area 212 and a non-active area 214. Here, sub-pixels 220 partitioned in a matrix form by intersections (or crossings) of the gate lines G1 to Gn and the data lines D1 to Dm are arranged in the active area 212. The non-active area 214 is positioned at the outside of the active area 212. The non-active area 214 may be defined by four faces positioned at the outside of the active area 212.

The driver 230 for supplying a drive signal to the gate links GL1 to GLn and the data links DL1 to DLm is mounted on one face of the non-active area 214. The data lines D1 to Dm are arranged to extend in a first direction, and the gate lines G1 to Gn are arranged to extend in a second direction perpendicular to (or crossing) the first direction.

The data links DL1 to DLm supply a data signal from the driver 230 to the data lines D1 to Dm. To this end, the data links DL1 to DLm extend in the first direction of the non-active area 214 from the driver 230, and are electrically connected to the data lines D1 to Dm positioned to extend in the first direction of the active area 212, respectively.

In this case, each of the data links DL1 to DLm and the data lines D1 to Dm form a pair of lines, and the pair of lines are positioned to overlap with each other on a same line with an insulating layer interposed therebetween. However, only a first data line D1 connected to a first data link DL1 is positioned at the outermost side of the active area 212.

Specifically, only the first data line D1 is positioned at the outermost side of the active area 212, and second and third data lines D2 and D3 are then positioned next to the first data line D1 with two sub-pixels 220 interposed therebetween. That is, except for the first data line D1 positioned at the outermost side of the active area 212, where pairs of the data lines D1 to Dm are formed with every two sub-pixels 220 to supply a data signal to the respective sub-pixels 220.

Here, in one embodiment, only the first data line D1 is formed at a side portion of the sub-pixels 220 positioned at the outermost side of the active area 212, and two pairs of the pairs of data lines D2 to Dm are formed with two sub-pixels of the sub-pixels 220 extending in the second direction interposed therebetween, except for side sub-pixels of the sub-pixels 220 positioned at the outermost side of the active area 212.

For example, since the second and third data lines D2 and D3 are formed to overlap with each other on the same line with the insulating layer interposed therebetween, the second data line D2 may supply the data signal to a second sub-pixel 220, and the third data line D3 may supply the data signal to a third sub-pixel 220. In the embodiment of the present invention, the sub-pixels 220 do not share the data lines, but individually receive the data signal from the data lines. Accordingly, it is possible to prevent or protect the data signal from being delayed.

The gate links GL1 to GLn supply a gate signal from the driver 130 to the gate lines G1 to Gn. To this end, the gate links GL1 to GLn extend out from the driver 230, and are extended to the active area 212 in the first direction that is the vertical direction in the non-active area 214 between the driver 230 and the active area 212.

In this case, the gate links GL1 to GLn formed in the non-active area 214 are positioned only in the non-active area 214 between the driver 230 and the active area 212 of the display panel 210. Since the gate links GL1 to GLn according to the embodiment of the present invention are positioned only in the non-active area 214 between the driver 230 and the active area 212 of the display panel 210, the faces of the non-active area 214, respectively positioned at both sides of the active area 212 can be removed, or the area of the faces can be reduced or minimized.

The gate links GL1 to GLn extend in the first direction that is the vertical direction and are electrically connected to the gate lines G1 to Gn and extended in the second direction perpendicular to (or crossing) the first direction in the active area 212, respectively. The gate links GL1 to GLn are respectively extended up to corresponding gate lines G1 to Gn connected as shown by bold line of FIG. 5B so as to supply a gate signal to the gate lines G1 to Gn.

In this case, two of the gate links GL1 to GLn form a pair of gate links between the data lines D1 to Dm, and the pair of gate links are positioned to overlap with each other on the same line with the insulating layer interposed therebetween. The pairs of gate links may be formed between the pairs of data lines in the active area 212, or may be formed with two sub-pixels 220 interposed therebetween, except the sub-pixels 220 positioned at the outermost side of the active area 212.

Alternatively, the pairs of gate links may be formed with two sub-pixels interposed therebetween, except the sub-pixels 220 positioned at the outermost side of the active area 212 and sub-pixels 220 adjacent to the sub-pixels 220 positioned at the outermost side of the active area 212. However, only an N-th gate link GLn is positioned at the other side of the outermost side of the active area 212.

Here, in one embodiment, two of the pairs of gate links are formed with two sub-pixels of the sub-pixels 220 extending in the second direction interposed therebetween, except first side sub-pixels of the sub-pixels 220 positioned at a first outermost side of the active area 212, and only one gate link GLn is formed at a side portion of second side sub-pixels of the sub-pixels 220 positioned at a second outermost side of the active area 212.

For example, first and second gate links GL1 and GL2 are formed with the insulating layer interposed therebetween, and are overlapped with each other on the same line between the sub-pixels 220 positioned at the outermost side and the sub-pixels 220 adjacent to the sub-pixels 220 positioned at the outermost side. Thus, the first gate link GL1 supplies the gate signal to the first gate line G1, and the second gate link GL2 supplies the gate signal to the second gate line G2.

The gate links GL1 to GLn are respectively extended up to the connected gate lines G1 to Gn so as to supply the gate signal to the gate lines G1 to Gn.

That is, in the active area 212, the first gate link GL1 extending in the first direction is extended up to the first gate line G1 extending in the second direction, and the second gate link GL2 extending in the first direction is extended up to the second gate line G2 extending in the second direction while overlapping with the first gate link GL1 extending in the first direction. As such, an N-th gate link GLn in the first direction is extended up to an N-th gate line Gn extending in the second direction.

In the embodiment of the present invention, an insulating layer is formed between a pair of gate links and between a pair of data lines so as to prevent (or protect) an electrical short circuit between the pair of gate links formed to overlap with each other on a same line and the data lines formed to overlap with each other on a same line in the active area 212.

In this case, since each of the pair of gate links extending in the same first direction and the pair of data lines spaced apart from the pair of gate links at the region of the sub-pixel 220 are positioned to overlap with each other with the insulating layer interposed therebetween, the interval between the sub-pixels 220 is not changed. That is, a non-display area having signal lines formed therein is not increased in the active area 212.

In the embodiment of the present invention, the gate links GL1 to GLn and the data links DL1 to DLm form pairs of links, and the paired links in each of the pairs of links are formed to overlap with each other, so that the area of a black matrix formed on the non-display area in the active area 212 can be reduced or minimized, thereby improving an aperture ratio.

Specifically, in region C in which a pair of gate links and a gate line are overlapped with each other, a gate line G is positioned on a first insulating layer 225 entirely deposited on a lower substrate 222 as shown in FIG. 6A. A first interlayer insulating layer 226 is positioned on the gate line G, and one gate link GL (e.g., the first gate link GL1) is positioned on the first interlayer insulating layer 226. A second interlayer insulating layer 227 is positioned on the first gate link GL1, and the other gate link GL' (e.g., the second gate link GL2) is positioned on the second interlayer insulating layer 227.

The gate line G and the one gate link GL are insulated from each other by the first interlayer insulating layer 226, and the one gate link GL and the other gate link GL' are insulated from each other by the second interlayer insulating layer 227. That is, the gate line G and the one gate link GL are formed to overlap with each other with the first interlayer insulating layer 226 interposed therebetween, and the one gate link GL and the other gate link GL' are formed to overlap with each other with the second interlayer insulating layer 227 interposed therebetween.

In region D in which a pair of data lines and a gate line are overlapped with each other, one data line D (e.g., the second data line D2) is positioned on the first insulating layer 225 entirely deposited on the lower substrate 222 as shown in FIG. 6B. The first interlayer insulating layer 226 is positioned on the one data line D, and a gate line G (e.g., an (N-1)-th gate line Gn-1) is positioned on the first interlayer insulating layer 226. The second interlayer insulating layer 227 is positioned on the gate line G, and the other data line D' (e.g., the third data line D3) is positioned on the second interlayer insulating layer 227.

The one data line D and the gate line G are insulated from each other by the first interlayer insulating layer 226, and the gate line G and the other data line D' are insulated from each other by the second interlayer insulating layer 227. That is, the one data line D and the gate line G are formed to overlap with each other with the first interlayer insulating layer 226 interposed therebetween, and the gate line G and the other data line D' are formed to overlap with each other with the second interlayer insulating layer 227 interposed therebetween.

Second and third insulating layers 228 and 229 may be further sequentially stacked on the other gate link GL' or the other data line D', which is an uppermost conductive layer, and a semiconductor layer 224 may be further formed between the lower substrate 222 and the first insulating layer 225.

Here, the first insulating layer 225 may be a gate oxide layer or gate insulating layer. The second insulating layer 228 may be a passivation layer, and the third insulating layer 229 may be an organic insulating layer.

As described above, according to the embodiment of the present invention, each pair of the gate links GL1 to GLn are overlapped with each other in the same direction with the insulating layer interposed therebetween. Thus, the gate links GL1 to GLn are not formed in the faces of the non-active area 214, respectively positioned at both sides of the active area 212, but formed in the active area 212. Also, each pair of the data lines D1 to Dm are overlapped with each other in the same direction with the insulating layer interposed therebetween, and thus, the data lines D1 to Dm are formed in the active area 212.

Accordingly, the faces of the non-active area 214, respectively positioned at both sides of the active area 212 having the related art gate links GL1 to GLn formed therein can be removed, or the area of the faces of the non-active area 214 can be minimized. In addition, the area of the black matrix formed in conjunction with the width or area of the non-active area 214 can be reduced or minimized, thereby improving the aperture ratio.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A display device comprising:
   a display panel having an active area in which sub-pixels formed at crossing regions of data lines extending in a first direction and gate lines extending in a second direction crossing the first direction are arranged, and a non-active area outside of the active area;
   a driver for supplying a drive signal to the gate and data lines in the display panel;
   data links extending in the first direction from the driver to supply a data signal to the data lines; and
   gate links extending out from the driver and extended up to the active area in the first direction from the non-active area between the driver and the active area so as to supply a gate signal to the gate lines extending in the second direction, and
   wherein the gate links formed in the non-active area are formed only in the non-active area between the driver and the active area, and the gate links are formed on a same line with the data lines in the active area.

2. The display device according to claim 1, wherein a gate link of the gate links and a corresponding data line of the data lines are formed to overlap with each other with an insulating layer interposed therebetween.

3. The display device according to claim 1, wherein a gate link of the gate links is extended up to a corresponding gate line of the gate lines to be electrically connected thereto.

4. A display device comprising:
   a display panel having an active area in which sub-pixels formed at crossing regions of data lines extending in a first direction and gate lines extending in a second direction crossing the first direction are arranged, and a non-active area outside of the active area;
   a driver for supplying a drive signal to the gate and data lines in the display panel;
   data links extending in the first direction from the driver to supply a data signal to the data lines; and
   gate links extending out from the driver and extended up to the active area in the first direction from the non-active area between the driver and the active area so as to supply a gate signal to the gate lines extending in the second direction, and
   wherein the gate links form pairs of gate links, and each of the pairs of gate links are formed on a same line in the active area.

5. The display device according to claim 4, wherein paired gate links in each of the pairs of gate links are formed to overlap with each other with an insulating layer interposed therebetween.

6. The display device according to claim 4, wherein a gate link of the gate links is extended up to a corresponding gate line of the gate lines to be electrically connected thereto.

7. The display device according to claim 4, wherein two pairs of the pairs of gate links are formed with two sub-pixels of the sub-pixels extending in the second direction interposed therebetween, except at first side sub-pixels of the sub-pixels positioned at a first outermost side of the active area, and that only one gate link of the gate links is formed at a side portion of second side sub-pixels of the sub-pixels positioned at a second outermost side of the active area.

8. The display device according to claim 4, wherein the data lines form pairs of data lines, and each of the pairs of data lines are formed on a same line in the active area.

9. The display device according to claim 8, wherein paired data lines in each of the pairs of data lines are formed to overlap with each other with an insulating layer interposed therebetween.

10. The display device according to claim 8, wherein only one data line of the data lines is formed at a side portion of the sub-pixels positioned at an outermost side of the active area, and two pairs of the pairs of data lines are formed with two sub-pixels of the sub-pixels extending in the second direction interposed therebetween, except at side sub-pixels of the sub-pixels positioned at the outermost side of the active area.

11. A display device comprising:
    a display panel having an active area in which sub-pixels formed at crossing regions of data lines extending in a first direction and gate lines extending in a second direction crossing the first direction are arranged, and a non-active area outside of the active area;
    a driver for supplying a drive signal to the gate and data lines in the display panel; and
    gate links extending out from the driver and extended up to the active area from the non-active area between the driver and the active area so as to supply a gate signal to the gate lines,
    wherein the gate links formed in the non-active area are formed only in the non-active area between the driver and the active area.

12. The display device according to claim 11, wherein the gate links are extended in the first direction of the data lines in the active area.

13. The display device according to claim 11, wherein a gate link of the gate links and a corresponding data line of the data lines are formed to overlap with each other on the same line with an insulating layer interposed therebetween.

14. The display device according to claim 11, wherein a gate link of the gate links is extended up to a corresponding gate line of the gate lines to be electrically connected thereto.

15. A display device comprising:
    a display panel having an active area in which sub-pixels formed at crossing regions of data lines extending in a first direction and gate lines extending in a second direction crossing the first direction are arranged, and a non-active area outside of the active area;
    a driver for supplying a drive signal to the gate and data lines in the display panel;
    data links extending in the first direction from the driver to supply a data signal to the data lines; and
    gate links extending out from the driver and extended up to the active area from the non-active area between the driver and the active area so as to supply a gate signal to the gate lines, wherein:
    the gate links formed in the non-active area are formed only in the non-active area between the driver and the active area;
    the gate links form pairs of gate links, and each of the pairs of gate links are formed on a same line, except at first side sub-pixels of the sub-pixels positioned at another side of an outermost side of the active area; and
    the data lines form pairs of data lines, and each of the pairs of data lines are formed on a same line, except at second side sub-pixels of the sub-pixels positioned at the outermost side of the active area.

16. The display device according to claim 15, wherein paired gate links in each of the pairs of gate links are formed to overlap with each other with a first insulating layer interposed therebetween, and data lines in each of the pairs of data lines are formed to overlap with each other with a second insulating layer interposed therebetween.

17. The display device according to claim 15, wherein only one data line of the data lines is formed at a side portion of the sub-pixels positioned at the outermost side of the active area, and only one gate line of the gate lines is formed at a side portion of the sub-pixels positioned at the other side of the outermost side of the active area.

18. The display device according to claim 15, wherein two pairs of the pairs of gate links are formed with two sub-pixels of the sub-pixels extending in the second direction interposed therebetween, except at the first side sub-pixels of the sub-pixels positioned at the other side of the outermost side of the active area.

19. The display device according to claim 15, wherein two pairs of the pairs of data lines are formed with two sub-pixels of the sub-pixels extending in the second direction interposed therebetween, except at the second side sub-pixels of the sub-pixels positioned at the outermost side of the active area.

* * * * *